March 29, 1932.    D. L. BLATTER    1,851,034
FINE FUEL CONTROLLING MEANS
Filed July 1, 1930    2 Sheets-Sheet 1
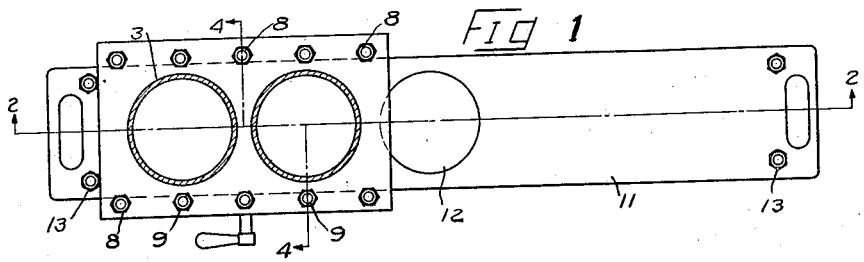
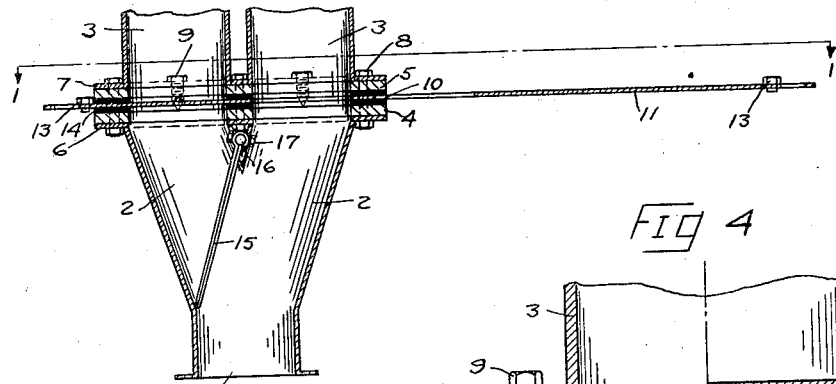
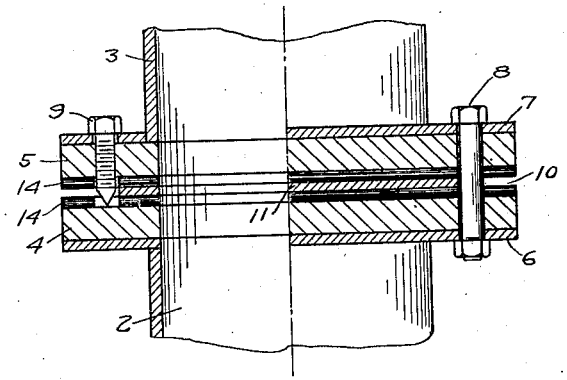
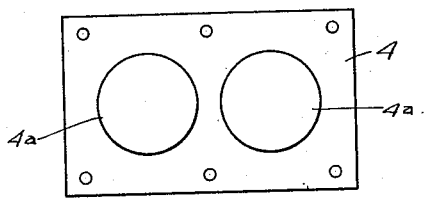
Donald L. Blatter
INVENTOR.
BY
ATTORNEYS.

March 29, 1932.   D. L. BLATTER   1,851,034
FINE FUEL CONTROLLING MEANS
Filed July 1, 1930   2 Sheets-Sheet 2
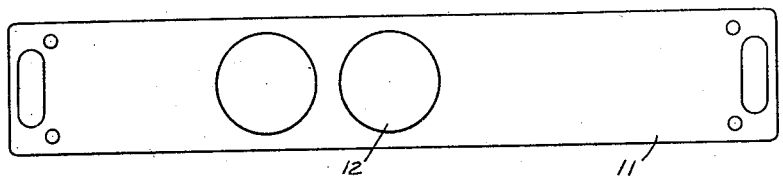
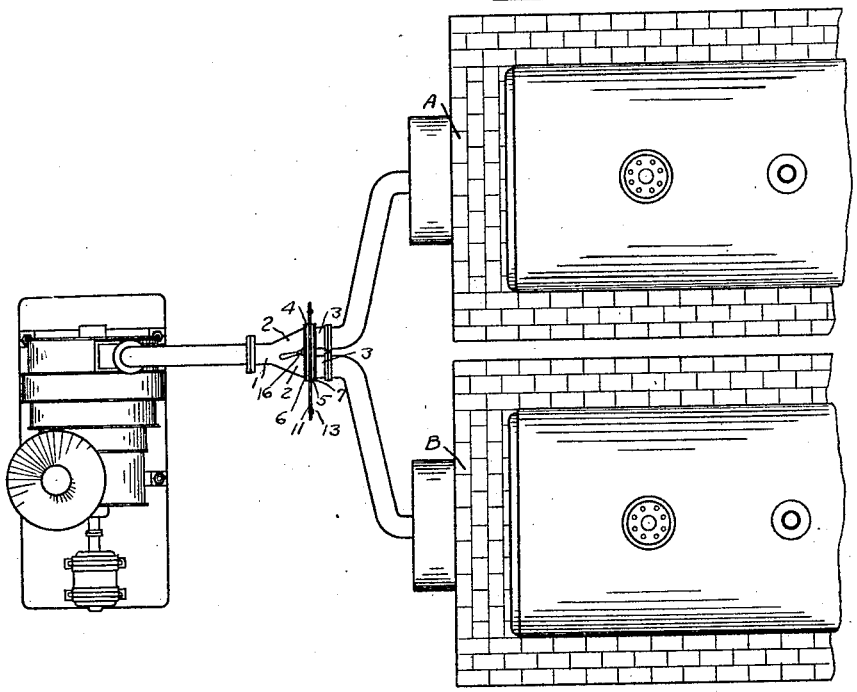
Donald L. Blatter
INVENTOR.
BY
ATTORNEYS.

Patented Mar. 29, 1932

1,851,034

UNITED STATES PATENT OFFICE

DONALD L. BLATTER, OF ERIE, PENNSYLVANIA, ASSIGNOR TO ERIE CITY IRON WORKS, OF ERIE, PENNSYLVANIA, A CORPORATION OF PENNSYLVANIA

FINE FUEL CONTROLLING MEANS

Application filed July 1, 1930. Serial No. 465,122.

In transferring fine material, such as powdered coal, by air it is very often desirable to feed the material through a portion of its travel in a single feed pipe and then carry this through branch pipes to different points of use as in adjacent furnaces. Where this is done, it is very frequently desirable to be able to shut off one, or the other of these furnaces and this has been usually attempted by deflector plates, or swinging shutter valves in the throat formed by the branch pipe. It is very difficult operating with as fine material as pulverized fuel to make such a means of control effective to prevent a certain amount of the coal filtering through and being discharged after such gate is closed. The present invention is designed to provide a closure which will definitely prevent any leakage, or movement of fine fuel except to the branch, or point of use desired. Features and details of the invention will appear from the specification and claims.

A preferred embodiment of the invention is illustrated in the accompanying drawings as follows:—

Fig. 1 shows a section on the line 1—1 in Fig. 2.

Fig. 2 a section on the line 2—2 in Fig. 1.

Fig. 3 a plan view of one of the plates forming the body of the valve.

Fig. 4 a section on the line 4—4 in Fig. 1.

Fig. 5 a plan view of the valve gate plate.

Fig. 6 an outline of furnaces to which the fuel may be delivered.

A feed pipe 1 delivers fuel to the Y or branch pipes 2 and from the Y to pipes 3 from which it is discharged into furnaces A and B. A valve body is formed of plates 4 and 5, each of these plates having openings 4a adapted to register with the branch pipes 3 and with each other. The Y has a flange 6, the branch pipes the flanges 7 and bolts extend through these flanges and through the plates 4 and 5 securing the plates forming the body of the valve together and the Y and branch pipes to the plates. The plates 4 and 5 are adjusted relatively to each other by screws 9. By loosening the bolts 8, adjusting the screws 9 and then again setting the bolts 8 any slot desired as 10 may be provided between the plates 4 and 5. A valve gate 11 is in the form of an ordinary plate and is provided with openings 12 which with the plate in the central position register with the two branch pipes 3. By moving the plate 11 in one direction, or the other, either branch pipe may be closed. Screws 13 are provided which form stops limiting the endwise movement of the gate.

In order that the valve may be made dustproof felt gaskets 14 are provided. These gaskets are the same in shape as the plate 4 illustrated in Fig. 3 and are held in place by the bolts 8 extending through them. A shutter 15 is mounted on a rock shaft 16 and locked therewith by means of a bolt 17. This shutter can be swung across the throat at the branch and thus the feed deflected to either branch as desired, or the shutter may be locked in the central position permitting a feeding action to both branches.

What I claim as new is:—

1. In a fine fuel controlling means, the combination of a feed pipe; branch pipes leading from the feed pipe; a shutter valve rotatively mounted in the throat of the branch pipes adapted to deflect the feed to either branch; a valve body through which the branch pipes lead having a gate slot therein; and valve means in the slot controlling the branch pipes.

2. In a fine fuel controlling means, the combination of a feed pipe; branch pipes leading from the feed pipe; a shutter valve rotatively mounted in the throat of the branch pipes adapted to deflect the feed to either branch; a valve body through which the branch pipes lead having a gate slot therein; and a single gate in the slot controlling both branches.

3. In a fine fuel controlling means, the combination of a feed pipe; branch pipes leading from the feed pipe; a shutter valve rotatively mounted in the throat of the branch pipes adapted to deflect the feed to either branch; a valve body through which the branch pipes lead comprising adjacent plates forming an intervening slot; and a gate arranged in the slot and controlling the branches.

4. In a fine fuel controlling means, the combination of a feed pipe; branch pipes leading from the feed pipe; a shutter valve rotatively mounted in the throat of the branch pipes adapted to deflect the feed to either branch; a valve body through which the branch pipes lead comprising adjacent plates forming an intervening slot; a gate arranged in the slot and controlling the branches; and means for adjusting the plates relatively to each other to vary the slot.

5. In a fine fuel controlling means, the combination of a feed pipe; branch pipes leading from the feed pipe; a shutter valve rotatively mounted in the throat of the branch pipes adapted to deflect the feed to either branch; a valve body through which the branch pipes lead comprising adjacent plates forming an intervening slot; a gate arranged in the slot and controlling the branches; and felt gaskets between the gate and the body.

6. In a fine fuel controlling means, the combination of a feed pipe; branch pipes leading from the feed pipe; a shutter valve in the throat of the branch pipes; means for rotatively mounting said shutter to deflect the fuel through either of said branches; a valve body through which the branch pipes lead, said valve body comprising two plates; bolts securing the plates together; adjusting screws for varying the distance between the plates; a control gate arranged between the plates; and gaskets between the gate and the plates.

In testimony whereof I have hereunto set my hand.

DONALD L. BLATTER.